(12) United States Patent  
Kang et al.

(10) Patent No.: US 12,530,568 B2  
(45) Date of Patent: Jan. 20, 2026

(54) ENCODER AND OPERATION METHOD THEREOF

(71) Applicant: Electronics and Telecommunications Research Institute, Daejeon (KR)

(72) Inventors: Tae Wook Kang, Daejeon (KR); Sung Eun Kim, Daejeon (KR); Kyung Jin Byun, Daejeon (KR); Kwang Il Oh, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 793 days.

(21) Appl. No.: 17/893,815

(22) Filed: Aug. 23, 2022

(65) Prior Publication Data

US 2023/0125421 A1   Apr. 27, 2023

(30) Foreign Application Priority Data

Oct. 25, 2021 (KR) .................. 10-2021-0143009

(51) Int. Cl.
*G06N 3/04* (2023.01)
*G06N 3/048* (2023.01)
(Continued)

(52) U.S. Cl.
CPC ............. *G06N 3/049* (2013.01); *G06N 3/048* (2023.01); *G06N 10/20* (2022.01)

(58) Field of Classification Search
CPC ........ G06N 3/049; G06N 10/20; G06N 10/00; G06N 3/048; G06N 3/0455; G06N 3/045; G06N 3/04; G06N 3/0475  
See application file for complete search history.

(56) References Cited

U.S. PATENT DOCUMENTS 9,047,568 B1 * 6/2015 Fisher .................... G06N 3/049  
9,311,594 B1 * 4/2016 Fisher .................... G06N 3/049  
(Continued)

FOREIGN PATENT DOCUMENTS

KR   10-2017-0021258 A   2/2017  
KR   10-2023-0007220     1/2023

OTHER PUBLICATIONS

Capecci et al., "A Feasibility Study of Using the NeuCube Spiking Neural Network Architecture for Modelling Alzheimer's Disease EEG Data", 2015, Springer International Publishing, pp. 159-172 (Year: 2015).*

(Continued)

*Primary Examiner* — Paulinho E Smith  
(74) *Attorney, Agent, or Firm* — KILE PARK REED & HOUTTEMAN PLLC

(57) ABSTRACT

Disclosed is operation method of an encoder that receives a continuous time-series signal and respectively transmits first to N-th input signals to first to N-th input neuron circuits of spike neural network circuit. The method of operating the encoder includes receiving the continuous time-series signal, generating a plurality of discrete quantum signals by sampling and quantizing the continuous time-series signal, selecting first to N-th discrete quantum signals among the plurality of discrete quantum signals, matching the selected first to N-th discrete quantum signals with the first to N-th input neuron circuits, respectively, identifying discrete quantum signals, each of which has a quantum level different from a quantum level of a previous discrete quantum signal, from among the second to N-th discrete quantum signals, and activating the input signals to be transmitted to the input neuron circuits corresponding to the identified discrete quantum signals and the first discrete quantum signal.

19 Claims, 11 Drawing Sheets

(51) Int. Cl.
    *G06N 3/049*        (2023.01)
    *G06N 10/20*        (2022.01)

(56) References Cited

U.S. PATENT DOCUMENTS

| | | | |
|---|---|---|---|
| 10,902,115 B2 | 1/2021 | Patrick et al. | |
| 11,257,507 B2* | 2/2022 | Garbacea | G06N 3/08 |
| 2015/0106311 A1* | 4/2015 | Birdwell | G06N 3/063 |
| | | | 706/26 |
| 2015/0372805 A1* | 12/2015 | Yoon | H04L 25/02 |
| | | | 375/358 |
| 2018/0005115 A1* | 1/2018 | Gokmen | G06N 3/084 |
| 2019/0213472 A1 | 7/2019 | Park et al. | |
| 2020/0019838 A1* | 1/2020 | Boahen | G06N 3/065 |
| 2020/0218959 A1* | 7/2020 | Srinivasa | G06N 3/08 |
| 2020/0293889 A1* | 9/2020 | Terasaki | G06N 3/065 |
| 2020/0302279 A1 | 9/2020 | Yu et al. | |
| 2021/0209514 A1* | 7/2021 | Kim | G06N 20/20 |
| 2025/0175192 A1* | 5/2025 | Galvin | H03M 7/3059 |

OTHER PUBLICATIONS

Lim et al., "Time-series forecasting with deep learning: a survey", 2021, Philosophical Transactions R. Soc., pp. 1-14 (Year: 2021).*
Vidya et al., "Q-SpiNN: A Framework for Quantizing Spiking Neural Networks", Jul. 2021, International Joint Conference on Neural Networks (IJCNN), pp. 1-8. (Year: 2021).*
Sengupta et al., "Spike-time encoding as a data compression technique for pattern recognition of temporal data," Information Sciences, 2017, pp. 133-145, vol. 406-407, Elsevier.

* cited by examiner

FIG. 4E

| n | FN(n) |
|---|---|
| 1 | K(1) |
| 2 | K(2) |
| 3 | K(3) |
| 4 | 0 |
| 5 | 0 |
| 6 | K(6) |
| 7 | K(7) |
| 8 | K(8) |
| 9 | 0 |

ENCODER AND OPERATION METHOD THEREOF

CROSS-REFERENCE TO RELATED APPLICATIONS

This application claims priority under 35 U.S.C. § 119 to Korean Patent Application No. 10-2021-0143009 filed on Oct. 25, 2021, in the Korean Intellectual Property Office, the disclosures of which are incorporated by reference herein in their entireties.

BACKGROUND

Embodiments of the present disclosure described herein relate to an encoder and an operating method thereof, and more particularly, relate to an encoder that converts a continuous time-series signal into input signals of a spike neural network (SNN), and an operating method thereof.

An artificial neural network (ANN) refers to a network in which human thinking, inference, or learning processes are implemented with an electronic circuit. The ANN may be implemented by mimicking neurons and synapses in a human body. The ANN may be learned by changing weights of synaptic circuits. The ANN may be applied in various fields such as risk recognition, security vigilance, autonomous driving, smart management, Internet of Things (IoT), and the like.

An SNN is one of the implementation methods of ANN. The SNN delivers a signal in a form of a pulse or spike firing during a short time. The SNN may operate with lower power than a perceptron-based neural network or a convolution-based neural network.

SUMMARY

Embodiments of the present disclosure provide an encoder for converting a continuous time series signal into a multidimensional input signal, and an operating method thereof.

According to an embodiment, a method of operating an encoder that receives a continuous time-series signal and respectively transmits first to N-th input signals to first to N-th input neuron circuits of an spike neural network circuit ('N' is a natural of '2' or more) is provided. The operating method includes receiving the continuous time-series signal, generating a plurality of discrete quantum signals by sampling and quantizing the continuous time-series signal, selecting first to N-th discrete quantum signals among the plurality of discrete quantum signals, matching the selected first to N-th discrete quantum signals with the first to N-th input neuron circuits, respectively, identifying discrete quantum signals, each of which has a quantum level different from a quantum level of a previous discrete quantum signal, from among the second to N-th discrete quantum signals, and activating the input signals to be transmitted to the input neuron circuits corresponding to the identified discrete quantum signals and the first discrete quantum signal.

In an embodiment, the selecting may be performed based on a quantum level threshold.

In an embodiment, the selecting of the first to N-th discrete quantum signals among the plurality of discrete quantum signals may include selecting the first discrete quantum signal, which is an initial discrete quantum signal having a quantum level greater than the quantum level threshold, and selecting the second to N-th discrete quantum signals, which are continuous from the first discrete quantum signal.

In an embodiment, the matching of the selected first to N-th discrete quantum signals with the first to N-th input neuron circuits may be performed in a time-series order of the selected first to N-th discrete quantum signals.

In an embodiment, the first to N-th input neuron circuits may output spike signals thus firing, in response to a fact that the input signals are activated, respectively.

In an embodiment, a firing count of the spike signal may be a constant.

According to an embodiment, an encoder includes a sampling unit that samples a continuous time-series signal and generates discrete signals, a quantization unit that generates a plurality of discrete quantum signals by quantizing the discrete signals, a selection unit that selects first to N-th discrete quantum signals among the plurality of discrete quantum signals and respectively matches the selected first to N-th discrete quantum signals with first to N-th input neuron circuits, a comparison unit that identifies discrete quantum signals, each of which has a quantum level different from a quantum level of a previous discrete quantum signal, from among the second to N-th discrete quantum signals, and an output unit that provides first to N-th input signals to the first to N-th input neuron circuits, respectively. The comparison unit determines to activate the input signals to be transmitted to the input neuron circuits corresponding to the identified discrete quantum signals.

In an embodiment, the selecting may be performed based on a quantum level threshold.

In an embodiment, the matching of the selected first to N-th discrete quantum signals with the first to N-th input neuron circuits may be performed in a time-series order of the selected first to N-th discrete quantum signals.

In an embodiment, the first to N-th input neuron circuits may output spike signals thus firing, in response to a fact that the input signals are activated, respectively.

In an embodiment, a firing count of the spike signal may be a constant.

According to an embodiment, an encoder includes a sampling unit that samples a continuous time-series signal and generates a plurality of discrete signals, a quantization unit that generates a plurality of discrete quantum signals by quantizing the plurality of discrete signals, a selection unit that selects first to N-th discrete quantum signals among the plurality of discrete quantum signals and respectively matches the selected first to N-th discrete quantum signals with first to N-th input neuron circuits, a comparison unit that compares each of quantum levels of the second to N-th discrete quantum signals with a quantum level of a previous discrete quantum signal, and an output unit that transmits first to N-th input signals to the first to N-th input neuron circuits, respectively. The comparison unit determines whether to activate the first to N-th input signals, based on the comparison result.

In an embodiment, the comparison unit may identify discrete quantum signals, each of which has a quantum level different from the quantum level of the previous discrete quantum signal, from among the second to N-th discrete quantum signals and may determine to activate the input signals to be transmitted to the input neuron circuits corresponding to the identified discrete quantum signals.

In an embodiment, the comparison unit may identify discrete quantum signals, each of which has a quantum level identical to the quantum level of the previous discrete quantum signal, from among the second to N-th discrete quantum signals and may determine to activate the input signals to be transmitted to the input neuron circuits corresponding to the identified discrete quantum signals.

In an embodiment, the comparison unit may activate the first input signal.

In an embodiment, the selection unit may select the first to N-th discrete quantum signals among the plurality of discrete quantum signals based on a quantum level threshold.

In an embodiment, the selection unit may select the first discrete quantum signal, which is an initial discrete quantum signal having a quantum level greater than the quantum level threshold, and the second to N-th discrete quantum signals continuous from the first discrete quantum signal.

In an embodiment, the first to N-th input neuron circuits may output spike signals thus firing, in response to a fact that the input signals are activated, respectively.

In an embodiment, a firing count of the spike signal may be a constant.

BRIEF DESCRIPTION OF THE FIGURES

The above and other objects and features of the present disclosure will become apparent by describing in detail embodiments thereof with reference to the accompanying drawings.

FIGS. 4A to 4E are diagrams for describing a process of generating a plurality of input signals based on a continuous time-series signal.

DETAILED DESCRIPTION

Hereinafter, embodiments of the present disclosure will be described in detail and clearly to such an extent that an ordinary one in the art easily implements the present disclosure. Specific details such as detailed components and structures are merely provided to assist the overall understanding of the embodiments of the present disclosure. Therefore, it should be apparent to those skilled in the art that various changes and modifications of the embodiments described herein may be made without departing from the scope and spirit of the present disclosure. Moreover, descriptions of well-known functions and structures are omitted for clarity and brevity. In the following drawings or in the detailed description, configurations may be connected with any other components except for components illustrated in a drawing or described in the detailed description. The terms described below are terms defined in consideration of the functions of the present disclosure and are not limited to a specific function. The definitions of the terms should be determined based on the contents throughout the specification.

Components that are described in the detailed description with reference to the terms "driver", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a microelectromechanical system (MEMS), a passive element, or a combination thereof.

The present disclosure relates to ANN. A neural network according to an embodiment of the present disclosure may process signals and information in a manner similar to a biological neural network. For example, the neural network of the present disclosure may include configurations corresponding to neurons, synapses, and the like of a biological neural network. Each of the components of the neural network according to an embodiment of the present disclosure may perform a function similar to each of components of the biological neural network.

Hereinafter, an SNN that processes a spike or pulse signal, and an encoder that provides input signals to the SNN will be representatively described. However, the scope of the present disclosure is not limited thereto. For example, the technical spirit of the present disclosure may be similarly applied to various ANNs, such as a perceptron-based neural network, a convolution-based neural network, and the like.

Figure 1:
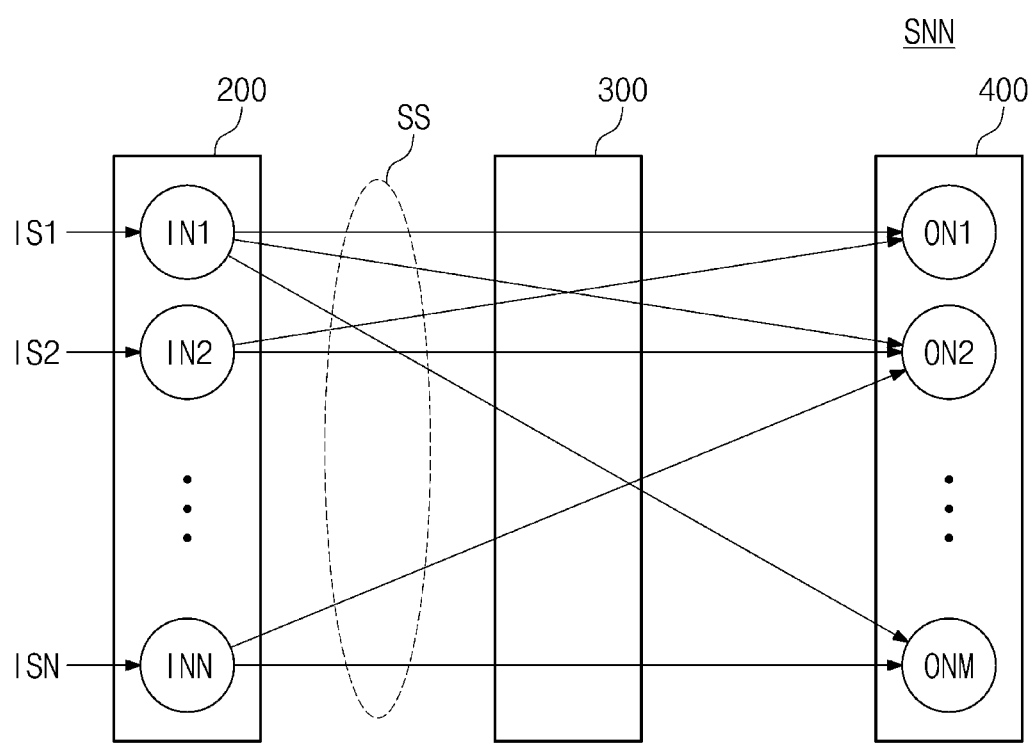
FIG. 1 is a block diagram illustrating a spike neural network, according to an embodiment of the present disclosure.

FIG. 1 is a block diagram illustrating a spike neural network, according to an embodiment of the present disclosure. Referring to FIG. 1, a spike neural network SNN may include an input neuron layer 200, a synapse layer 300, and an output neuron layer 400.

The input neuron layer 200 may include first to N-th input neuron circuits IN1 to INN. The first to N-th input neuron circuits IN1 to INN may receive input signals IS1 to ISN, respectively. The first to N-th input neuron circuits IN1 to INN may output spike signals SS, respectively. Each of the spike signals SS may fire in response to an input signal IS received by a corresponding input neuron circuit IN.

The synapse layer 300 may perform weight calculation on the spike signals SS. For example, the synapse layer 300 may apply different weights to the spike signals SS, respectively. The weight of the synapse layer 300 may be determined based on the relationship (or correlation) between the input neuron circuits IN and corresponding output neuron circuits ON.

In an embodiment, the spike neural network SNN may be learned through weights of the synapse layer 300. For example, the spike neural network SNN may receive a plurality of input signals. The spike neural network SNN may change weights of the synapse layer 300 in response to the received input signals.

In an embodiment, the spike neural network SNN may be learned by spike timing dependent plasticity (STDP).

The output neuron layer 400 may include first to M-th output neuron circuits ON1 to ONM. Each of the first to M-th output neuron circuits ON1 to ONM may receive the spike signals SS from the corresponding first to N-th input neuron circuits IN1 to INN. Each of the first to M-th output neuron circuits ON1 to ONM may accumulate the spike signals SS thus received. In an embodiment, the spike signals SS may be accumulated by accumulating charges. In this case, the output neuron circuit ON, which accumulated charges is greater than a threshold, may output a spike signal.

In an embodiment, the size of the neuron layer may mean the number of neurons included in the neuron layer. For example, the size of the input neuron layer 200 may be 'N', and the size of the output neuron layer 400 may be 'M'. Each of 'N' and 'M' may be any integer greater than or equal to 1 or may be different from each other.

In an embodiment, the spike neural network SNN may request the same number (e.g., 'N') of input signals IS as the size 'N' of the input neuron layer 200. For example, the first to N-th input neuron circuits IN1 to INN may require the different input signals IS from one another. Hereinafter, an encoder that generates the same number of the input signals IS as the size 'N' of the input neuron layer 200 based on a continuous time-series signal and an operation method thereof will be described in detail.

Figure 2:
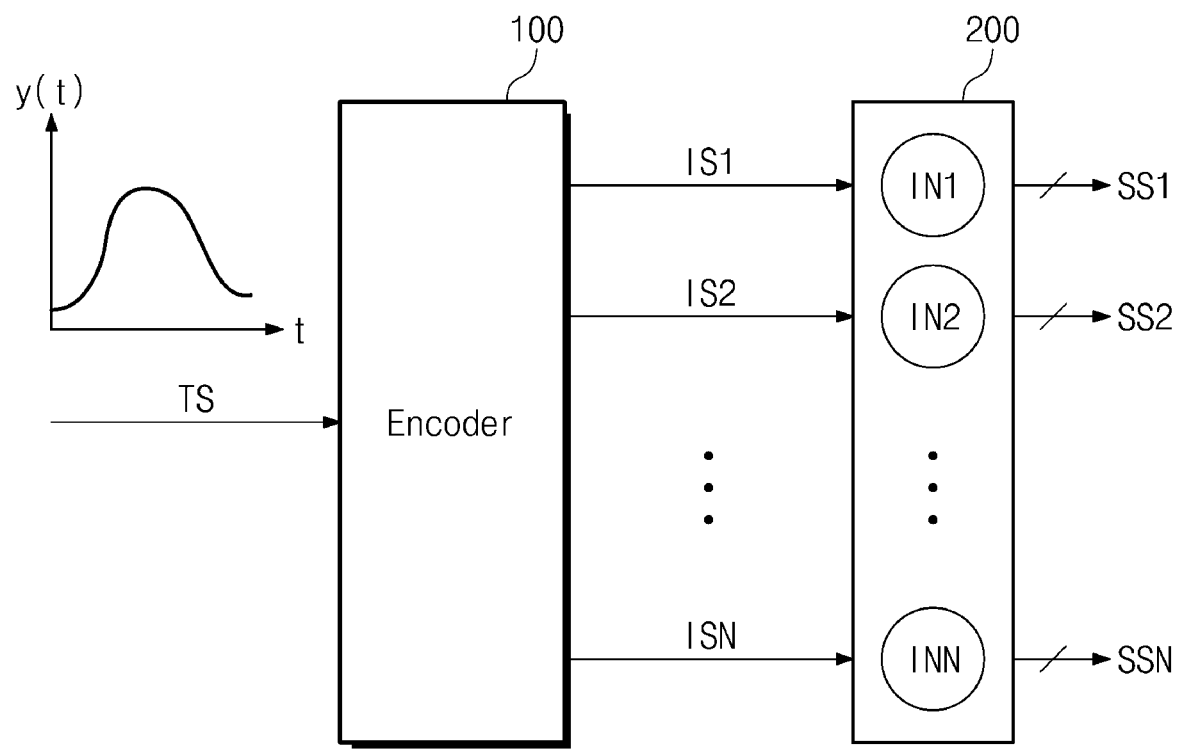
FIG. 2 is a block diagram illustrating operations of an encoder and an input neuron layer of FIG. 1, according to an embodiment of the present disclosure.

FIG. 2 is a block diagram illustrating operations of an encoder and an input neuron layer of FIG. 1, according to an embodiment of the present disclosure. Referring to FIG. 2, an encoder 100 may receive a continuous time-series signal TS. The encoder 100 may output first to N-th input signals IS1 to ISN.

In an embodiment, the continuous time-series signal TS may be a signal whose amplitude changes over time. For example, the continuous time-series signal TS may be expressed as a function of an amplitude y(t) that changes depending on a change in time 't'.

In an embodiment, the continuous time-series signal TS may be a biological signal such as an electroencephalogram (EEG), an electrocardiogram (ECG), or the like. However, the scope of the present disclosure is not limited thereto, and the continuous time-series signal TS may be a signal, which indicates a measurement value of information that changes over time, such as an audio signal, an illuminance signal, or the like.

Continuing to refer to FIG. 2, the input neuron layer 200 may receive first to N-th input signals IS1 to ISN. The first to N-th input signals IS1 to ISN may be provided to the first to N-th input neuron circuits IN1 to INN, respectively. The first to N-th input neuron circuits IN1 to INN may output first to N-th spike signals SS1 to SSN, respectively. For example, the first input neuron circuit IN1 may output the first spike signal SS1. Functions and operations of the input neuron layer 200 and the input neuron circuits IN are similar to those described above, and thus a detailed description thereof will be omitted to avoid redundancy.

In an embodiment, the first to N-th spike signals SS1 to SSN may fire in response to activation of the first to N-th input signals IS1 to ISN, respectively. For example, the first spike signal SS1 may fire in response to the activation of the first input signal IS1. The number of spike signal firing (i.e., firing count) and firing interval of the spike signals SS will be described in detail with reference to FIG. 5 below.

Figure 3:
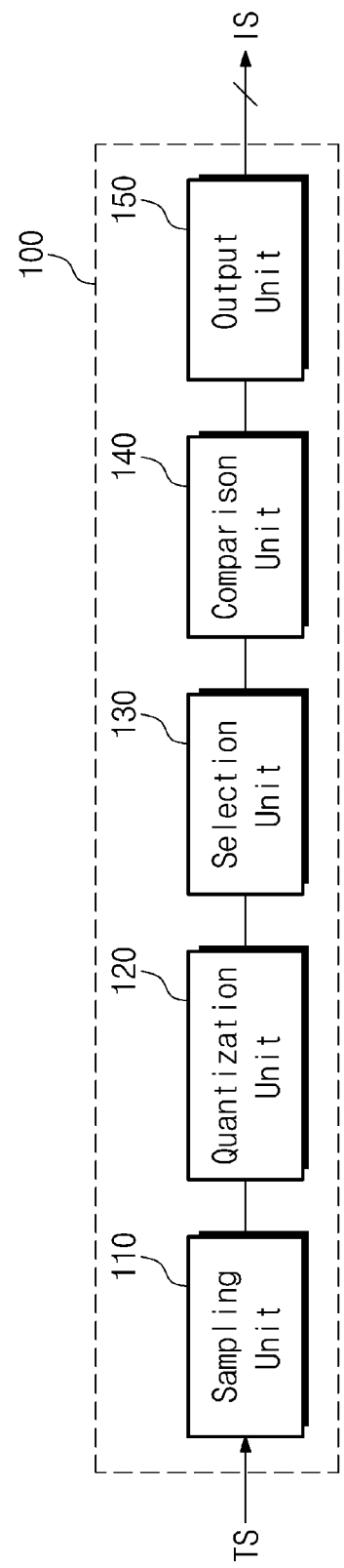
FIG. 3 is a block diagram illustrating the encoder of FIG. 2 in more detail.

FIG. 3 is a block diagram illustrating the encoder of FIG. 2 in more detail. Referring to FIGS. 2 and 3, the encoder 100 may include a sampling unit 110, a quantization unit 120, a selection unit 130, a comparison unit 140, and an output unit 150.

Hereinafter, an example in which the continuous time-series signal TS sequentially passes through the sampling unit 110, the quantization unit 120, the selection unit 130, the comparison unit 140, and the output unit 150 and is converted into a plurality of the input signals IS is described representatively. However, the scope of the present disclosure is not limited thereto, and the continuous time-series signal TS may pass through the sampling unit 110, the quantization unit 120, the selection unit 130, the comparison unit 140, and the output unit 150 in an any order and may be converted to the input signals IS. For example, before passing through the sampling unit 110 and the quantization unit 120, the continuous time-series signal TS may pass through the selection unit 130.

The sampling unit 110 may convert the continuous time-series signal TS into a plurality of discrete signals. For example, the sampling unit 110 may sample the continuous time-series signal TS at a specific time interval. However, the scope of the present disclosure is not limited thereto, and the sampling unit 110 may sample the continuous time-series signal TS at an arbitrary time interval. The operation of the sampling unit 110 will be described in more detail with reference to FIG. 4B below.

The quantization unit 120 may convert the plurality of discrete signals into a plurality of discrete quantum signals. For example, the quantization unit 120 may quantize the plurality of discrete signals. That is, the quantization unit 120 may approximate levels of the plurality of discrete signals to predetermined quantum levels. The operation of the quantization unit 120 will be described in more detail with reference to FIG. 4C below.

The selection unit 130 may select first to N-th discrete quantum signals among the plurality of discrete quantum signals. First of all, the selection unit 130 may select a discrete quantum signal, which is earliest in time-series and which has a quantum level greater than a quantum level threshold, from among the plurality of discrete quantum signals. Hereinafter, the discrete quantum signal, which is earliest in time-series and which has a quantum level greater than a quantum level threshold is referred to as the initial discrete quantum signal or the first discrete quantum signal. Moreover, the selection unit 130 may select discrete quantum signals as much as the size 'N' of the input neuron layer 200 from the first discrete quantum signal continuously. For example, the selection unit 130 may select a total of 'N' discrete quantum signals from the initial discrete quantum signal. In this case, the 'N' discrete quantum signals selected among the plurality of quantum signals may be referred to as first to N-th discrete quantum signals.

In an embodiment, the quantum level threshold may be a constant that is arbitrarily specified. The quantum level threshold may be a value appropriately defined to determine whether the continuous time-series signal TS includes valid data.

In an embodiment, when the quantum level threshold is specified as a relatively large constant, the amount of data processed by the spike neural network SNN may be reduced. When the quantum level threshold is specified as a relatively small constant, the amount of data processed by the spike neural network SNN may increase.

The selection unit 130 may match the selected first to N-th discrete quantum signals with the first to N-th input neuron circuits IN1 to INN, respectively. In an embodiment, the selected first to N-th discrete quantum signals may correspond to the first to N-th input neuron circuits IN1 to INN in a time-series order, respectively. Hereinafter, an embodiment in which the selected first to N-th discrete quantum signals correspond to the first to N-th input neuron circuits IN1 to INN in a time-series order will be representatively described. However, the scope of the present disclosure is not limited thereto, and the selected discrete quantum signals may randomly correspond to (e.g., randomly scramble) the first to N-th input neuron circuits IN1 to INN.

The operation of the selection unit 130 will be described in more detail with reference to FIG. 4D below.

The comparison unit 140 may compare a quantum level of each of the second to N-th discrete quantum signals with a quantum level of the previous discrete quantum signal. For example, the comparison unit 140 may compare a quantum level of an n-th discrete quantum signal with a quantum level of a (n−1)-th discrete quantum signal (here, it is assumed that n is an integer of 2 or more and N or less).

The comparison unit 140 may determine whether to activate the input signals IS, based on the comparison result. For example, the comparison unit 140 may determine whether to activate the n-th input signal ISn, based on a result of comparing the quantum level of the n-th discrete quantum signal with the quantum level of the (n−1)-th discrete quantum signal. Moreover, the comparison unit 140 may determine to activate the first input signal IS1.

In an embodiment, when the quantum level of the n-th discrete quantum signal is different from the quantum level of the (n−1)-th discrete quantum signal, the comparison unit 140 may activate an input signal ISn which is transmitted to the n-th input neuron circuit INn. Hereinafter, an embodiment in which the corresponding input signal ISn is activated when the quantum level of the n-th discrete quantum signal is different from the quantum level of the (n−1)-th discrete quantum signal will be representatively described.

However, in another embodiment, when the quantum level of the n-th discrete quantum signal is the same as the quantum level of the (n−1)-th discrete quantum signal, the input signal ISn transmitted to the n-th input neuron circuit INn may be activated.

The output unit 150 may output the first to N-th input signals IS1 to ISN to the first to N-th input neuron circuits IN1 to INN, respectively. In this case, each of the first to N-th input signals IS1 to ISN may be a signal whose activation is determined by the comparison unit 140.

In an embodiment, the first to N-th input signals IS1 to ISN may be signals for allowing the first to N-th input neuron circuits IN1 to INN to output the first to N-th spike signals SS1 to SSN that fire, respectively. In this case, whether to fire each of the first to N-th spike signals SS1 to SSN may be determined depending on whether the corresponding input signal IS is activated.

In an embodiment, a count at which the spike signals SS fires (i.e., firing count) may be a constant.

In an embodiment, different input signals may be activated for different continuous time-series signals TS. In this case, compared to a method for processing amplitude values in a form of image data, the different continuous time-series signals TS may be identified simply. Accordingly, according to an embodiment of the present disclosure, an encoder capable of efficiently distinguishing between the different continuous time-series signals is provided.

In an embodiment, as the size 'N' of the input neuron layer 200 increases, the spike neural network SNN may accurately distinguish between the different continuous time-series signal TS from one another.

In an embodiment, with respect to the different continuous time-series signals TS, the spike neural network SNN may be learned through different input signals. In this case, the spike neural network SNN may distinguish between the different continuous time-series signals TS through the weight of the synapse layer 300. For example, different output neuron circuits ON may fire in response to the different continuous time-series signal TS.

Operations of the comparison unit 140 and the output unit 150 will be described in more detail with reference to FIG. 4E below.

Figure 4A:
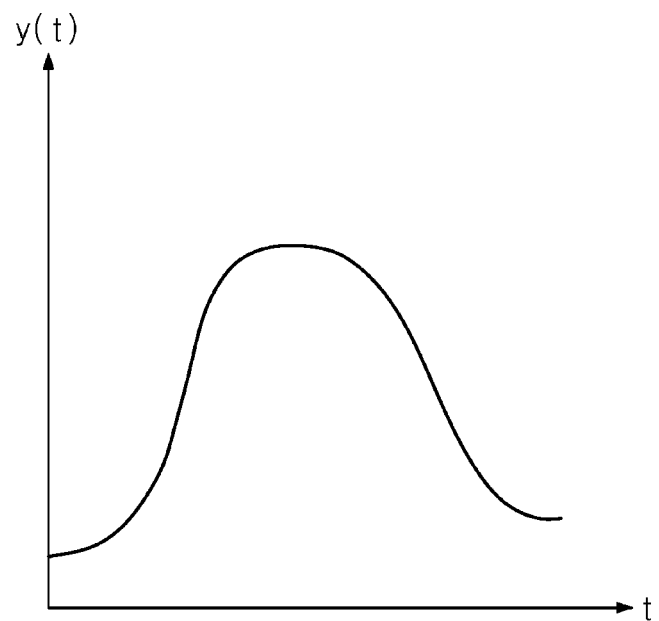
Figure 4B:
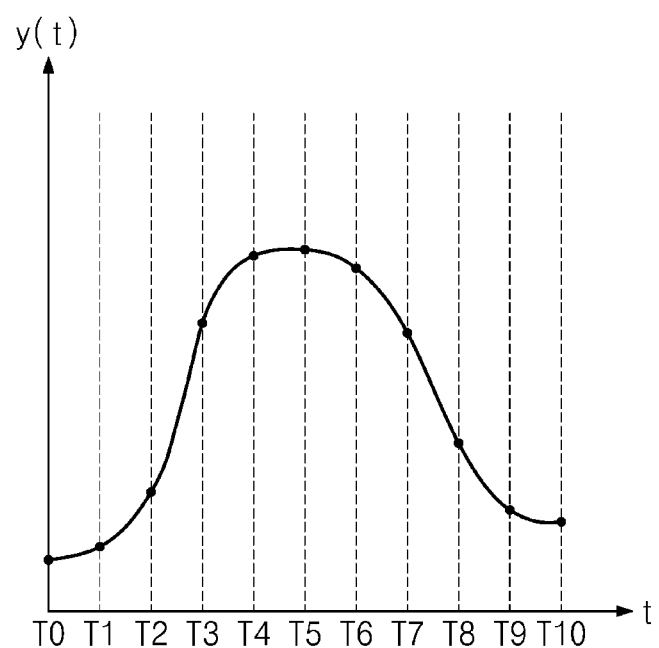
Figure 4C:
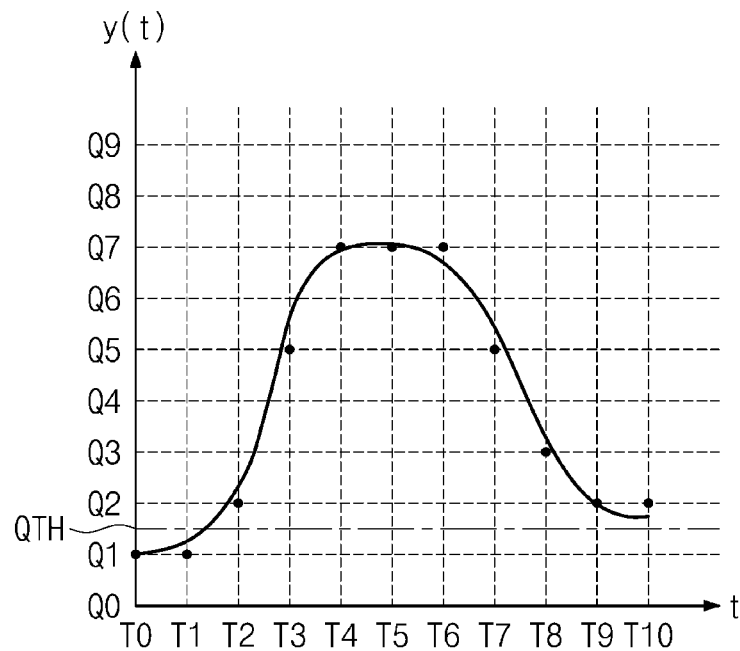
Figure 4D:
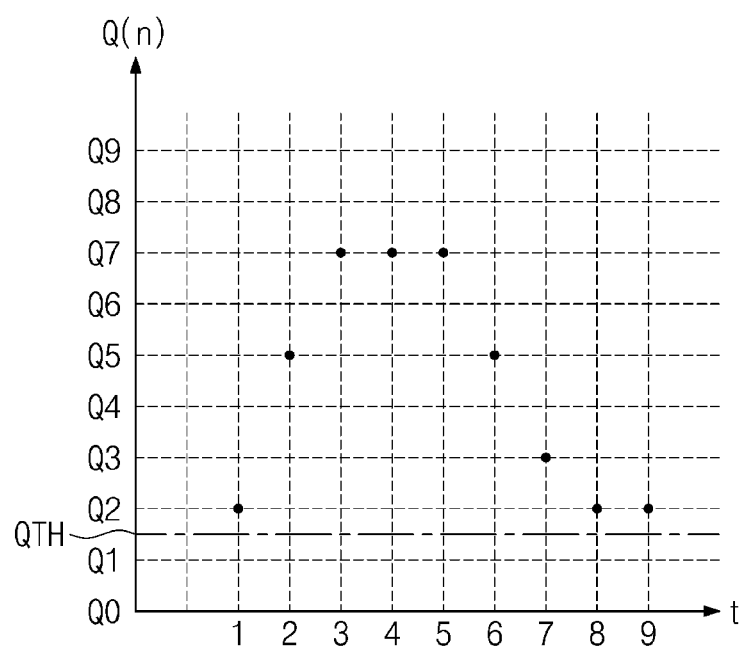

FIGS. 4A to 4E are diagrams for describing a process of generating a plurality of input signals based on a continuous time-series signal. In FIGS. 4A to 4C, a horizontal axis represents the passage of time, and a vertical axis represents a level of a signal. The horizontal axis of FIG. 4D indicates an index of an input neuron circuit, and the vertical axis of FIG. 4D indicates a quantum level of the signal. First of all, referring to FIGS. 2, 3, and 4A, the continuous time-series signal TS is illustrated. Descriptions of the continuous time-series signal TS are similar to those described above with reference to FIG. 2, and thus a detailed description thereof will be omitted to avoid redundancy.

Referring to FIGS. 2, 3, and 4B, the continuous time-series signal TS may be converted into a plurality of discrete signals by being sampled at a constant time interval. For example, the sampling unit 110 may sample the continuous time-series signal TS from a 0-th time point T0 to a tenth time point T10. In this case, the continuous time-series signal TS may be converted into discrete signals defined only from the 0-th time point T0 to the tenth time point T10. Hereinafter, the discrete signals defined from the 0-th time point T0 to the tenth time point T10 are referred to as 0-th to tenth time point discrete signals, respectively.

In an embodiment, a time interval between the 0-th time point T0 and the tenth time point T10 may be constant. However, the scope of the present disclosure is not limited to the sampling count or sampling interval of the continuous time-series signal TS.

In an embodiment, signal levels of a plurality of discrete signals may be continuously defined depending on a signal level of the continuous time-series signal TS. For example, when the signal level of the continuous time-series signal TS at a second time point T2 is defined as y(T2), the signal level of a second time point discrete signal may be defined as y(T2).

Referring to FIGS. 2, 3, and 4C, each of a plurality of discrete signals may be quantized. For example, the quantization unit 120 may quantize the plurality of discrete signals. The quantization unit 120 may approximate signal levels of the plurality of discrete signals to predetermined quantum levels. In this case, the plurality of discrete signals may be converted into a plurality of discrete quantum signals.

For example, the quantization unit 120 may quantize the plurality of discrete signals based on predetermined 0-th to ninth quantum levels Q0 to Q9.

In an embodiment, level intervals between the 0-th to ninth quantum level Q0 to Q9 may be constant. However, the scope of the present disclosure is not limited to the number of quantum levels or the interval between quantum levels.

In an embodiment, as the interval of quantum level is narrow, the spike neural network SNN may accurately distinguish between the different continuous time-series signals TS.

In an embodiment, the signal levels of the plurality of discrete signals may be quantized by rounding, rounding up, or rounding down the signal levels of the plurality of discrete signals to a predetermined quantum level. Hereinafter, an embodiment in which signal levels of 0-th to tenth time point discrete signals are rounded and quantized will be representatively described, but the scope of the present disclosure is not limited thereto.

Each of the signal levels of the 0-th to tenth time point discrete signals may be approximated to adjacent quantum levels. For example, the signal level of the second time point discrete signal may be greater than the second quantum level Q2 and may be smaller than the third quantum level Q3. In this case, the level of the second time point discrete signal may be approximated to the second quantum level Q2, which is closer to the level of the second time point discrete signal, from among the second quantum level Q2 and the third quantum level Q3. Hereinafter, similarly to those described above, signals obtained by quantizing signal levels of the 0-th to tenth time point discrete signals may be referred to as 0-th to tenth time point discrete quantum signals, respectively.

Referring to FIGS. 2, 3, 4C, and 4D, some of the discrete quantum signals may be selected. For example, the selection unit 130 may select some of the 0-th to tenth time point discrete quantum signals. In this case, the number of discrete quantum signals to be selected may be determined depending on the size of the input neuron layer 200. Hereinafter, an embodiment in which the size 'N' of the input neuron layer 200 is nine will be described, but the scope of the present disclosure is not limited thereto.

The selection unit 130 may select the initial discrete quantum signal having a quantum level greater than a quantum level threshold QTH among discrete quantum signals. For example, each of the second to tenth time point discrete quantum signals may have a quantum level greater than the quantum level threshold QTH. The second to tenth time point discrete quantum signals may be signals corresponding to the second to tenth time points T2 to T10, respectively. The selection unit 130 may select the second time point discrete quantum signal corresponding to a time point (e.g., the second time point T2), which is earliest, from among second to tenth time points T2 to T10, as the initial discrete quantum signal. Hereinafter, the second time point discrete quantum signal is referred to as the initial discrete quantum signal or the first discrete quantum signal.

The selection unit 130 may select continuous discrete quantum signals as much as the size N of the input neuron layer 200 from the second time point discrete quantum signal (i.e., the initial discrete quantum signal). For example, the selection unit 130 may select nine signals ('N' pieces) from the second time point discrete quantum signal to the tenth time point discrete quantum signal. Hereinafter, the selected nine discrete quantum signals are referred to as first to ninth discrete quantum signals.

The selection unit 130 may match the selected nine discrete quantum signals with the first to ninth input neuron circuits IN1 to IN9, respectively. In an embodiment, the selected first to ninth discrete quantum signals may sequentially correspond to first to N-th input neuron circuits IN1 to IN9 in a time-series order. For example, the first input neuron circuit IN1 may correspond to the first discrete quantum signal, and the second input neuron circuit IN2 may correspond to the second discrete quantum signal. Similarly, the third to ninth input neuron circuits IN3 to IN9 may correspond to third to ninth discrete quantum signals, respectively.

However, the scope of the present disclosure is not limited thereto, and the discrete quantum signals may randomly correspond to input neuron circuits, respectively.

Figure 4E:
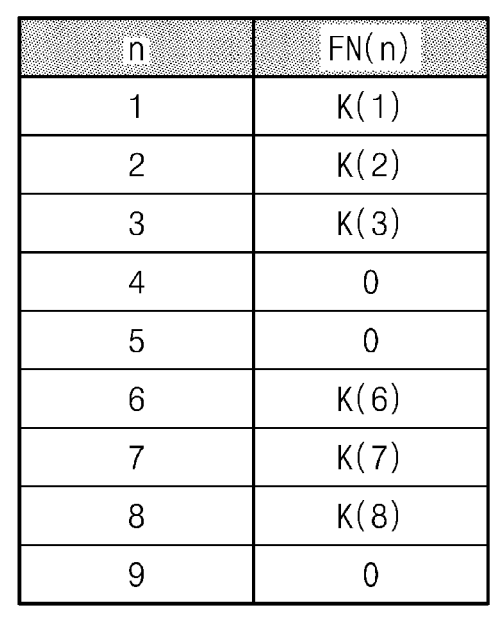

Referring to FIGS. 2, 3, and 4E, the number of firings of the spike signal output by the input neuron circuit may be determined based on the input signal. The left column of the table of FIG. 4E indicates an index 'n' of the input neuron circuit IN, and the right column indicates the number FN(n) of firings of the spike signals SS output by the corresponding input neuron circuit IN.

For example, the first spike signal SS1 output by the first input neuron circuit IN1 may fire K(1) times.

The number FN of firings of each of the second to ninth spike signal SS2 to SS9 respectively output by the second to ninth input neuron circuit IN2 to IN9 may be determined based on the quantum level of the corresponding discrete quantum signal. For example, the comparison unit 140 may compare a quantum level of an n-th discrete quantum signal with a quantum level of a (n−1)-th discrete quantum signal.

The comparison unit 140 may determine whether to activate the input signals IS, based on the comparison result. That is, the comparison unit 140 may determine whether to activate the n-th input signal ISn, based on a result of comparing the quantum level of the n-th discrete quantum signal with the quantum level of the (n−1)-th discrete quantum signal.

For example, a quantum level corresponding to the second discrete quantum signal (e.g., the fifth quantum level Q5) is different from a quantum level corresponding to the first discrete quantum signal (e.g., the second quantum level Q2). In this case, the second input signal IS2 transmitted to the second input neuron circuit IN2 may be activated.

In an embodiment, when the n-th input signal ISn is activated, the n-th input neuron circuit INn may output the n-th spike signal SSn that fires. In this case, a number of the n-th spike signal SSn firing (i.e., firing count) may be determined as a function K(n) for n. For example, when the second input signal IS2 is activated, the second input neuron circuit IN2 may output the second spike signal SS2 that fires. In this case, the second spike signal SS2 may be fired K(2) times.

Hereinafter, for convenience of description, it is assumed that a number of K(n) the n-th spike signal SSn fires (i.e., firing count) is constant 'K'. However, the scope of the present disclosure is not limited thereto, and K(n) may be a function in which the corresponding quantum level is changed based on the number of continuously the same input neurons.

On the other hand, a quantum level (e.g., the seventh quantum level Q7) of the fourth discrete quantum signal is the same as a quantum level (e.g., the seventh quantum level Q7) of the third discrete quantum signal. In this case, the fourth input signal IS4 transmitted to the fourth input neuron circuit IN4 may be deactivated. Accordingly, the fourth spike signal SS4 may not fire.

Figure 5:
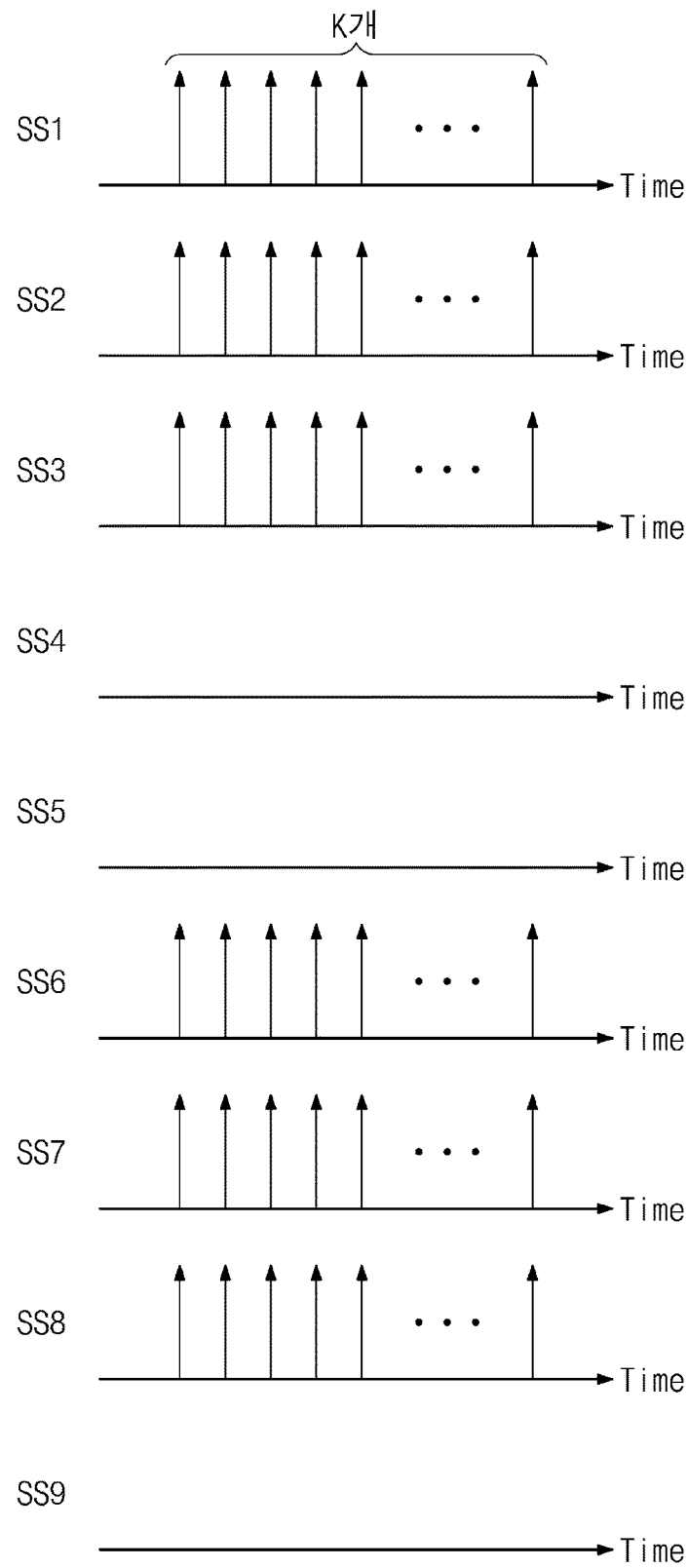
FIG. 5 is a diagram illustrating spike signals output from input neuron circuits.

FIG. 5 is a diagram illustrating spike signals output from input neuron circuits. A horizontal axis of FIG. 5 represents the passage of time. A vertical axis of FIG. 5 indicates whether a spike signal fires. Referring to FIGS. 2 to 5, the first to third and sixth to eighth input neuron circuits IN1 to IN3 and IN6 to IN8 may output the first to third and sixth to eighth spike signals SS1 to SS3 and SS6 to SS8, respectively. In this case, each of the first to third and sixth to eighth spike signals SS1 to SS3 and SS6 to SS8 may be a signal that fires K times.

The fourth to fifth and ninth input neuron circuits IN4 to IN5 and IN9 may output fourth to fifth and ninth spike signals SS4 to SS5 and SS9, respectively. In this case, the fourth to fifth and ninth spike signals SS4 to SS5 and SS9 may not fire. That is, each of the fourth to fifth, and ninth spike signals SS4 to SS5 and SS9 may be in an idle state.

In an embodiment, the firing period of the spike signals SS may be determined based on various neural coding methods such as rate coding and temporal coding.

In an embodiment, a time interval at which the spike signals SS fires may be determined by Poisson distribution.

Figure 6:
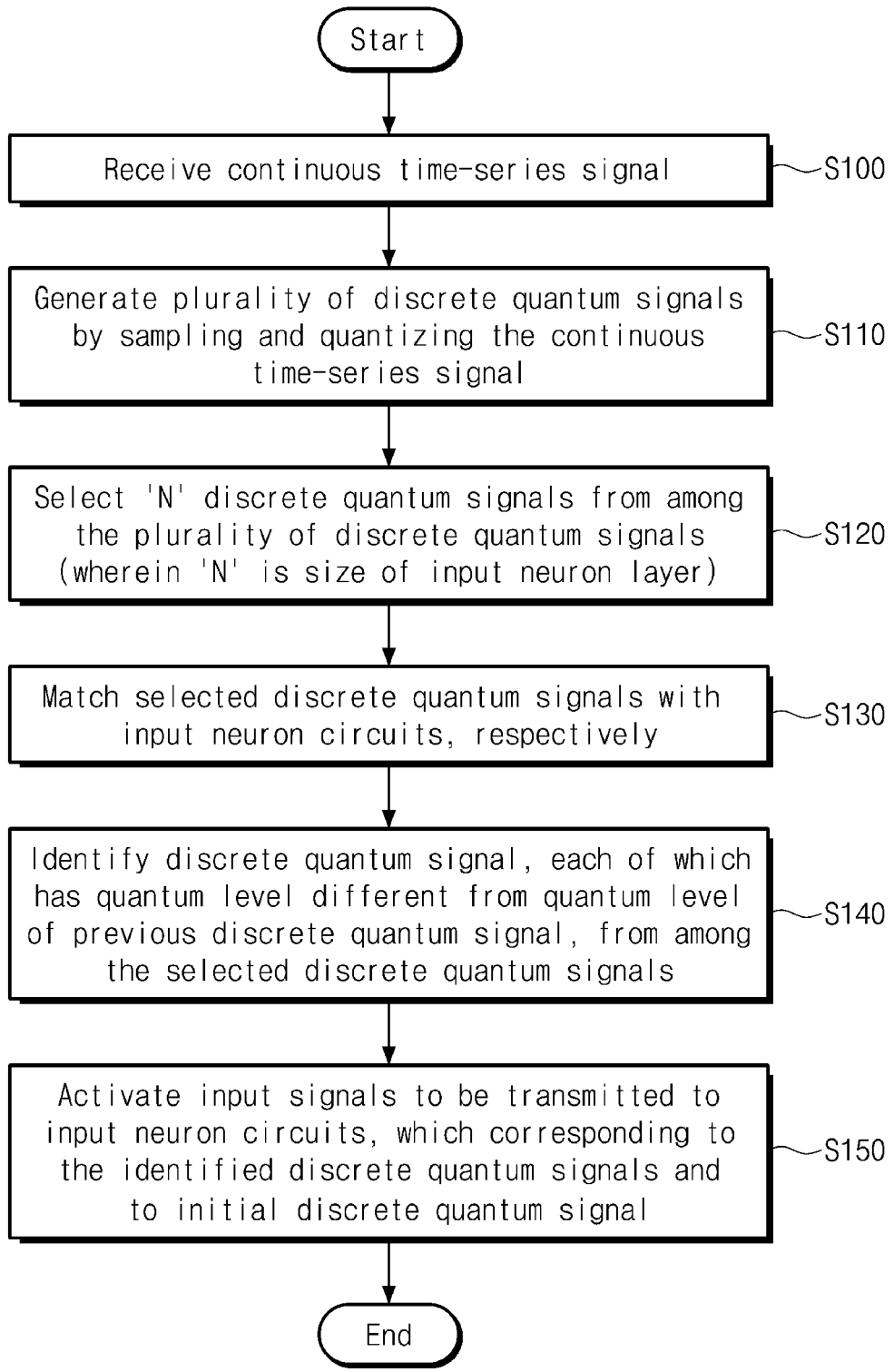
FIG. 6 is a flowchart illustrating a method of operating an encoder, according to an embodiment of the present disclosure.

FIG. 6 is a flowchart illustrating a method of operating an encoder, according to an embodiment of the present disclosure. Referring to FIGS. 2 to 6, in operation S100, the encoder 100 may receive the continuous time-series signal TS.

In operation S110, the encoder 100 may generate a plurality of discrete quantum signals by sampling and quantizing the continuous time-series signal TS. For example, the encoder 100 may convert the continuous time-series signal TS into a plurality of discrete quantum signals through the sampling unit 110 and the quantization unit 120. In an embodiment, when the sampling and quantization interval is reduced, the spike neural network SNN may accurately distinguish between the different continuous time-series signals TS.

In operation S120, the encoder 100 may select the same number of discrete quantum signals as the size N of the input neuron layer 200 among a plurality of discrete quantum signals. For example, the encoder 100 may select first to N-th discrete quantum signals among a plurality of discrete quantum signals through the selection unit 130. A method of operating the encoder 100 that selects first to N-th discrete quantum signals will be described in more detail with reference to FIG. 7 below.

In an embodiment, 'N' may mean the size of the input neuron layer 200 or the number of input neuron circuits IN.

In operation S130, the encoder 100 may match the selected discrete quantum signals with input neuron circuits, respectively. For example, the encoder 100 may match the first to N-th discrete quantum signals with the first to N-th input neuron circuits IN1 to INN through the selection unit 130, respectively. In an embodiment, the selected first to N-th discrete quantum signals may correspond to the first to N-th input neuron circuits IN1 to INN in a time-series order, respectively. However, the scope of the present disclosure is not limited thereto, and the selected discrete quantum signals may randomly correspond to (e.g., randomly scramble) the first to N-th input neuron circuits IN1 to INN.

In operation S140, the encoder 100 may identify discrete quantum signals having a quantum level different from that of the previous discrete quantum signal among the selected discrete quantum signals. For example, the encoder 100 may identify discrete quantum signals, each of which has a quantum level different from that of the previous discrete quantum signal, from among the second to N-th discrete quantum signals through the comparison unit 140.

In operation S150, the encoder 100 may activate the input signal IN to be transmitted to the input neuron circuits IN corresponding to the discrete quantum signals identified in operation S140, and a discrete quantum signal that is earliest (i.e., initial discrete quantum signal). For example, the encoder 100 may activate the input signal IN which is to be transmitted to the input neuron circuits IN corresponding to the discrete quantum signals identified through the comparison unit 140 and the first discrete quantum signal.

In an embodiment, the encoder 100 may transmit the first to N-th input signals IS1 to ISN to the first to N-th input neuron circuits IN1 to INN through the output unit 150, respectively.

In an embodiment, the activated input signals IS may be signals that allow the corresponding input neuron circuits IN to output the spike signals SS that fire, respectively.

In an embodiment, a count at which the spike signals SS fires may be a constant. For example, when the activated input signal IS is received, the first to N-th input neuron circuits IN1 to INN may output the spike signals SS that fire K times, respectively.

In an embodiment, the firing period of the spike signals SS may be determined based on various neural coding methods such as rate coding and temporal coding.

In an embodiment, a time interval at which the spike signals SS fires may be determined by Poisson distribution.

Figure 7:
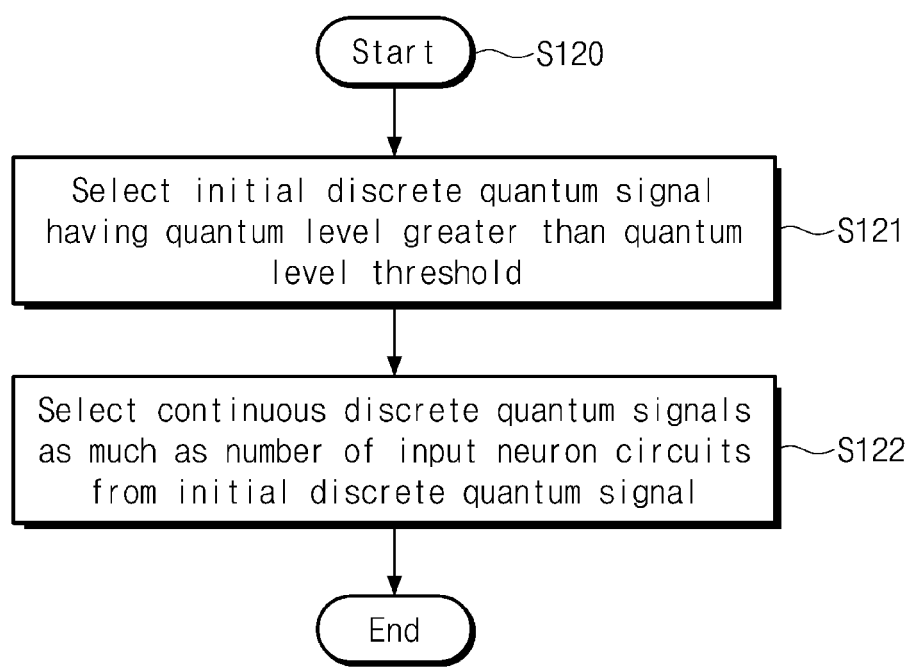
FIG. 7 is a flowchart illustrating step S120 of FIG. 6 in more detail.

FIG. 7 is a flowchart illustrating step S120 of FIG. 6 in more detail. Referring to FIGS. 3, 6 and 7, first to N-th discrete quantum signals among a plurality of discrete quantum signals may be determined through the following operations.

In operation S121, the encoder 100 may select the initial discrete quantum signal having a quantum level greater than a quantum level threshold QTH. For example, the encoder 100 may select a discrete quantum signal, which is earliest in time-series and which has a quantum level greater than the quantum level threshold QTH, from among the plurality of discrete quantum signals through the selection unit 130.

In an embodiment, the discrete quantum signal, which is earliest in time-series and which has a quantum level greater than the quantum level threshold QTH, from among the plurality of discrete quantum signals may be referred to as the initial discrete quantum signal or the first discrete quantum signal.

In an embodiment, the quantum level threshold QTH may be determined in consideration of the amount of computation of the spike neural network SNN.

In operation S122, the encoder 100 may select continuous discrete quantum signals as much as the size 'N' of the input neuron layer from the initial discrete quantum signal. For example, the encoder 100 may select a total of 'N' discrete quantum signals from the initial discrete quantum signal through the selection unit 130.

In an embodiment, the selected 'N' discrete quantum signals may be referred to as first to N-th discrete quantum signals, respectively.

Figure 8:
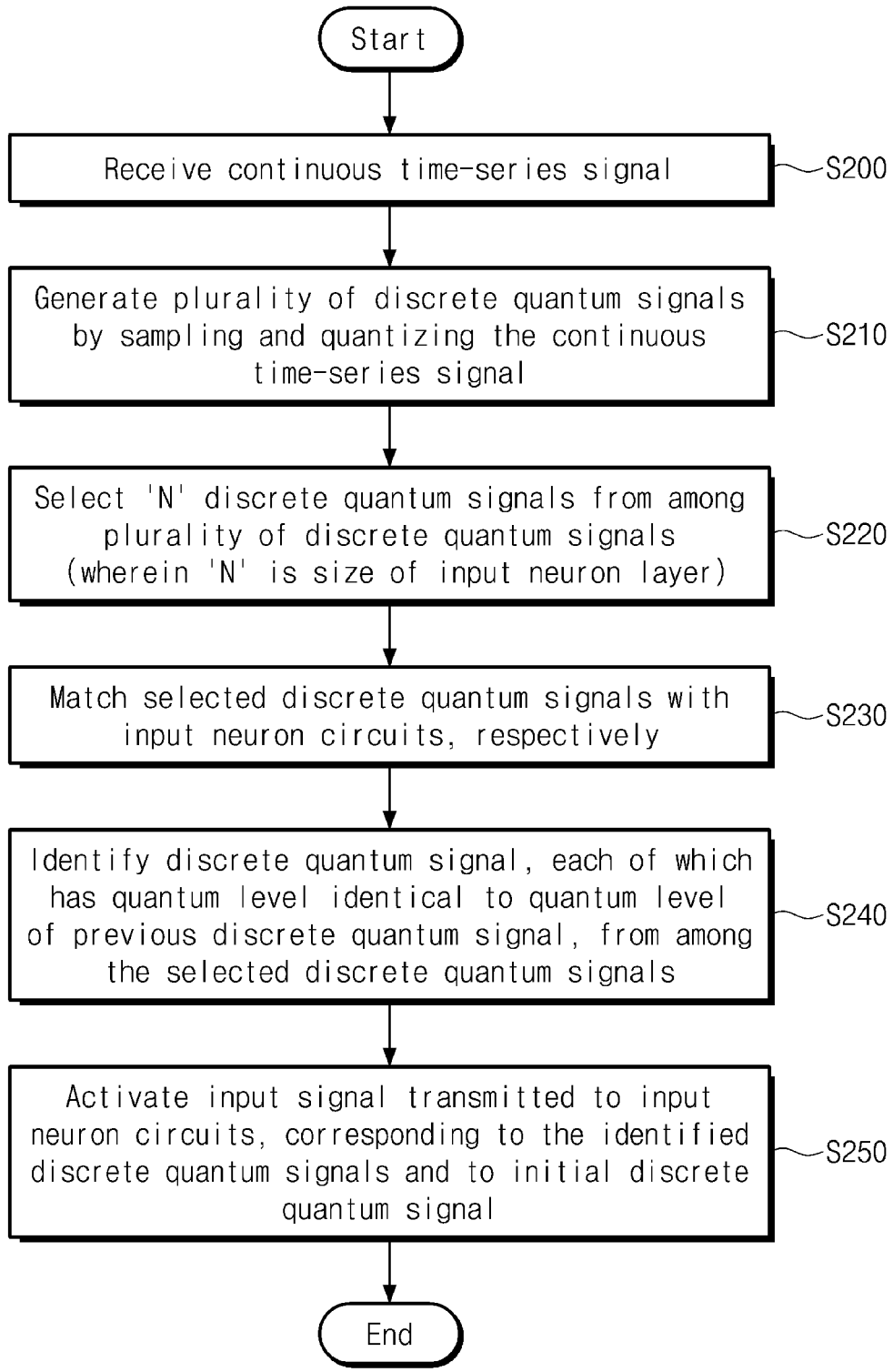
FIG. 8 is a flowchart illustrating a method of operating an encoder, according to an embodiment of the present disclosure.

FIG. 8 is a flowchart illustrating a method of operating an encoder, according to an embodiment of the present disclosure. Referring to FIGS. 3 and 5 to 8, operations S200 to S230 and S250 are substantially the same as operations S100 to S130 and S150 described in detail with reference to FIG. 6 above, and thus a detailed description thereof will be omitted to avoid redundancy.

In operation S240, the encoder 100 may identify a discrete quantum signal having a quantum level identical to that of the previous discrete quantum signal among the selected discrete quantum signals. For example, the encoder 100 may identify discrete quantum signals, each of which has a quantum level identical to that of the previous discrete quantum signal, from among the second to N-th discrete quantum signals through the comparison unit 140.

In an embodiment, the activated input signals IS may be signals that allow the corresponding input neuron circuits IN to output the spike signals SS that fire, respectively.

Figure 9A:
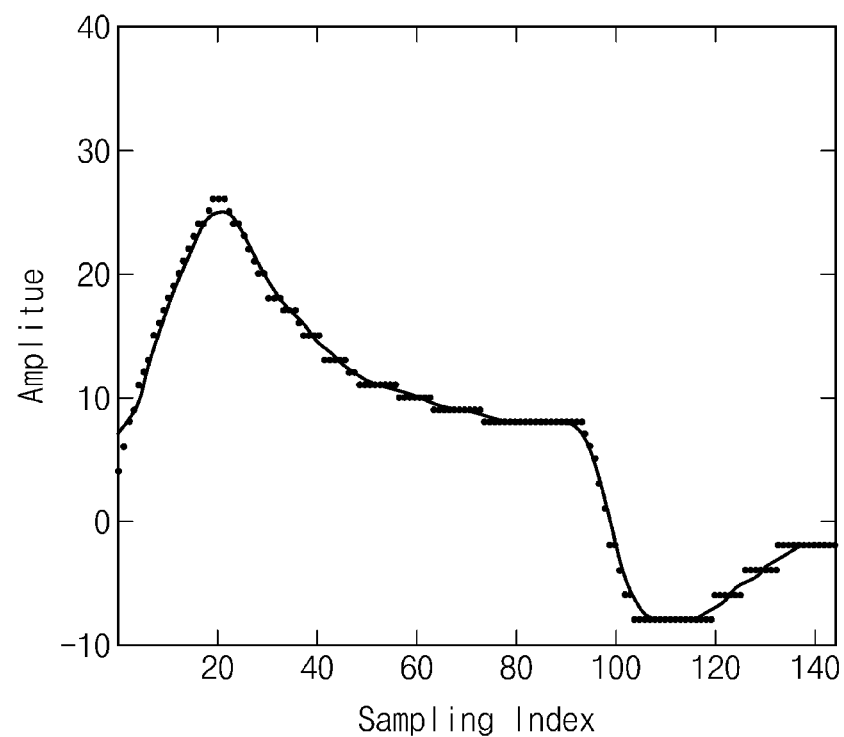
FIGS. 9A and 9B illustrate conversion of a continuous time-series signal, according to an embodiment of the present disclosure.
Figure 9B:
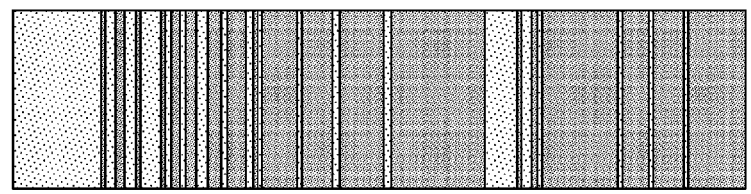

FIGS. 9A and 9B are diagrams illustrating conversion of a continuous time-series signal, according to an embodiment of the present disclosure. A graph displayed by a solid line in FIG. 9A shows a continuous time-series signal. In this case, a horizontal axis of FIG. 9A represents the passage of time, and a vertical axis of FIG. 9A represents amplitude.

A dot graph of FIG. 9A shows discrete quantum signals obtained by converting the continuous time-series signal. In this case, the horizontal axis of FIG. 9A indicates indexes of corresponding input neuron circuits. The vertical axis of FIG. 9A represents a quantum level of a signal. For example, when the index of the input neuron circuits is 20, the quantum level of a discrete quantum signal may be 26.

For convenience of description, FIG. 9A illustrates that the continuous time-series signal TS is converted when the size N of the input neuron layer 200 is 64 and the quantum threshold QTH is 4.

FIG. 9B shows the spike signals SS that fire in response to the input signals IS activated by the discrete quantum signals of FIG. 9A. A horizontal axis of FIG. 9B indicates indexes of corresponding input neuron circuits IN. A black region displayed in FIG. 9B may mean that a corresponding spike signal fires, and a gray region displayed in FIG. 9B may mean that the corresponding spike signal does not fire.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, it is possible to provide an encoder for efficiently encoding a continuous time-series signal into a plurality of input signals to provide input neuron circuits of SNN with the plurality of input signals, and an operating method thereof.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of an encoder configured to receive a continuous time-series signal and to respectively transmit first to N-th input signals to first to N-th input neuron circuits of a spike neural network (SNN) circuit (wherein 'N' is a integer of '2' or more), the method comprising:
    receiving the continuous time-series signal;
    generating a plurality of discrete quantum signals by sampling and quantizing the continuous time-series signal;
    selecting first to N-th discrete quantum signals from among the plurality of discrete quantum signals;
    matching the selected first to N-th discrete quantum signals with the first to N-th input neuron circuits, respectively;
    identifying discrete quantum signals, each of which has a quantum level different from a quantum level of a previous discrete quantum signal, from among the second to N-th discrete quantum signals; and
    activating the input signals to be transmitted to the input neuron circuits corresponding to the identified discrete quantum signals and to the first discrete quantum signal.

2. The method of claim 1, wherein the selecting is performed based on a quantum level threshold.

3. The method of claim 2, wherein the selecting of the first to N-th discrete quantum signals among the plurality of discrete quantum signals includes:
    selecting the first discrete quantum signal, which is an initial discrete quantum signal having a quantum level greater than the quantum level threshold; and
    selecting the second to N-th discrete quantum signals, which are continuous from the first discrete quantum signal.

4. The method of claim 1, wherein the matching of the selected first to N-th discrete quantum signals with the first to N-th input neuron circuits is performed in a time-series order of the selected first to N-th discrete quantum signals.

5. The method of claim 1, wherein the first to N-th input neuron circuits output firing spike signals, in response to activation of the input signals, respectively.

6. The method of claim 5, wherein a firing count of the spike signal is a constant.

7. An encoder comprising:
    at least one processor and at least one memory comprising one or more sequences of one or more instructions that, wherein when executed by the at least one processor, cause the encoder at least to provide:
        a sampling unit configured to sample a continuous time-series signal and to generate discrete signals;
        a quantization unit configured to generate a plurality of discrete quantum signals by quantizing the discrete signals;
        a selection unit configured to select first to N-th discrete quantum signals (wherein 'N' is a integer of '2' or more) from among the plurality of discrete quantum signals, and to respectively match the selected first to N-th discrete quantum signals with first to N-th input neuron circuits;
        a comparison unit configured to identify discrete quantum signals, each of which has a quantum level different from a quantum level of a previous discrete quantum signal, from among the second to N-th discrete quantum signals; and
        an output unit configured to provide first to N-th input signals to the first to N-th input neuron circuits, respectively, wherein the comparison unit determines to activate the input signals to be transmitted to the input neuron circuits corresponding to the identified discrete quantum signals.

8. The encoder of claim 7, wherein the selecting is performed based on a quantum level threshold.

9. The encoder of claim 7, wherein the matching of the selected first to N-th discrete quantum signals with the first to N-th input neuron circuits is performed in a time-series order of the selected first to N-th discrete quantum signals.

10. The encoder of claim 7, wherein the first to N-th input neuron circuits output firing spike signals, in response to activation of the input signals, respectively.

11. The encoder of claim 10, wherein a firing count of the spike signal is a constant.

12. An encoder comprising:
    at least one processor and at least one memory comprising one or more sequences of one or more instructions that, wherein when executed by the at least one processor, cause the encoder at least to provide:
        a sampling unit configured to sample a continuous time-series signal and to generate a plurality of discrete signals;
        a quantization unit configured to generate a plurality of discrete quantum signals by quantizing the plurality of discrete signals;
        a selection unit configured to select first to N-th discrete quantum signals (wherein 'N' is a integer of '2' or more) from among the plurality of discrete quantum signals and to respectively match the selected first to N-th discrete quantum signals with first to N-th input neuron circuits;

a comparison unit configured to compare each of quantum levels of the second to N-th discrete quantum signals with a quantum level of a previous discrete quantum signal; and an output unit configured to transmit first to N-th input signals to the first to N-th input neuron circuits, respectively, wherein the comparison unit determines whether to activate the first to N-th input signals, based on the comparison result.

13. The encoder of claim 12, wherein the comparison unit is configured to:

identify discrete quantum signals, each of which has a quantum level different from the quantum level of the previous discrete quantum signal, from among the second to N-th discrete quantum signals; and determine to activate the input signals to be transmitted to the input neuron circuits corresponding to the identified discrete quantum signals.

14. The encoder of claim 12, wherein the comparison unit is configured to:

identify discrete quantum signals, each of which has a quantum level identical to the quantum level of the previous discrete quantum signal, from among the second to N-th discrete quantum signals; and determine to activate the input signals to be transmitted to the input neuron circuits corresponding to the identified discrete quantum signals.

15. The encoder of claim 12, wherein the comparison unit is configured to activate the first input signal.

16. The encoder of claim 12, wherein the selection unit is configured to:

select the first to N-th discrete quantum signals among the plurality of discrete quantum signals based on a quantum level threshold.

17. The encoder of claim 16, wherein the selection unit is configured to:

select the first discrete quantum signal, which is an initial discrete quantum signal having a quantum level greater than the quantum level threshold, and the second to N-th discrete quantum signals continuous from the first discrete quantum signal.

18. The encoder of claim 12, wherein the first to N-th input neuron circuits firing output spike signals in response to activation of the input signals respectively.

19. The encoder of claim 18, wherein a firing count of the spike signal is a constant.

* * * * *